(12) United States Patent
Kim et al.

(10) Patent No.: US 10,877,952 B2
(45) Date of Patent: Dec. 29, 2020

(54) FLIGHT MANAGEMENT SYSTEM UPDATES

(71) Applicant: The Boeing Company, Chicago, IL (US)

(72) Inventors: Geun Il Kim, Bellevue, WA (US);
Kevin Patrick Corbett, Bothell, WA (US); Frank DiGiovanni, Brier, WA (US)

(73) Assignee: THE BOEING COMPANY, Chicago, IL (US)

( * ) Notice: Subject to any disclaimer, the term of this patent is extended or adjusted under 35 U.S.C. 154(b) by 195 days.

(21) Appl. No.: 15/275,086

(22) Filed: Sep. 23, 2016

(65) Prior Publication Data

US 2018/0089247 A1    Mar. 29, 2018

(51) Int. Cl.
*G06F 16/23* (2019.01)
*G01C 21/00* (2006.01)
*G01C 23/00* (2006.01)

(52) U.S. Cl.
CPC .............. *G06F 16/23* (2019.01); *G01C 21/00* (2013.01); *G01C 23/00* (2013.01)

(58) Field of Classification Search
None
See application file for complete search history.

(56) References Cited

U.S. PATENT DOCUMENTS

| | | | | |
|---|---|---|---|---|
| 8,467,915 B1 * | 6/2013 | Pangilinan | | G06F 17/00 340/945 |
| 9,224,302 B1 * | 12/2015 | Young | | G08G 5/0039 |
| 2003/0236811 A1 * | 12/2003 | Green | | G06F 11/3423 718/100 |
| 2006/0143515 A1 * | 6/2006 | Kuramkote | | G06F 11/366 714/15 |
| 2006/0265503 A1 * | 11/2006 | Jones | | G06F 17/30899 709/227 |
| 2009/0112464 A1 * | 4/2009 | Belcher | | G01C 21/165 701/414 |
| 2011/0111861 A1 * | 5/2011 | St Martin | | G07F 17/32 463/42 |
| 2012/0143406 A1 * | 6/2012 | O'Connor | | G01C 21/00 701/3 |
| 2013/0124015 A1 * | 5/2013 | Pangilinan | | G08G 5/0021 701/3 |
| 2014/0200750 A1 * | 7/2014 | Pitard | | G08G 5/0021 701/3 |
| 2015/0073691 A1 * | 3/2015 | Mere | | G05D 1/101 701/120 |
| 2015/0148998 A1 * | 5/2015 | Mere | | G05D 1/00 701/3 |
| 2016/0171897 A1 * | 6/2016 | Mere | | B64C 13/18 701/3 |

(Continued)

*Primary Examiner* — Richard L Bowen
(74) *Attorney, Agent, or Firm* — Gates & Cooper LLP (57) ABSTRACT

An improved system for updating a flight management system of an aircraft is described. A flight management system is configured to execute an operation. The flight management system can comprise a storage device storing thereon a database. The database is configured to store data usable by the flight management system to execute the operation and receive updates to the database that pertain to the operation executed by the flight management system. The updated database enables updating of the operation without updating the operational software of the flight management system.

21 Claims, 9 Drawing Sheets

(56) References Cited

U.S. PATENT DOCUMENTS

| | | | |
|---|---|---|---|
| 2016/0282127 A1* | 9/2016 | Goto | G01C 21/30 |
| 2016/0328978 A1* | 11/2016 | Ramaker | G01C 21/20 |
| 2017/0132938 A1* | 5/2017 | Lax | G06F 17/50 |
| 2017/0197727 A1* | 7/2017 | Kim | G06F 16/23 |
| 2017/0343357 A1* | 11/2017 | Mere | G01C 21/20 |

* cited by examiner

FLIGHT MANAGEMENT SYSTEM UPDATES

TECHNICAL FIELD

The present invention relates generally, but not exclusively, to systems and computing devices in an aircraft, and more particularly to updating systems such as the flight management system.

BACKGROUND

A flight management system (FMS) is an example of an avionics system that may be implemented as a programmed computer system that provides a number of flight-related tasks. Some flight-related functions may include guidance, flight planning, datalink, and performance. Updating the functionality in the flight management system software for an FMS has historically been performed when software updates are needed. However, software updates for flight-related can be complex and can take months or years to develop and verify. Moreover, at times, not all errors may be caught and fixed before the flight management system software is initially released to users.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The illustrative examples described herein provide a way to employ a database to provide an update to systems such as a flight management system (FMS). For example, updates to the operations (e.g., performance computation methods) may be directly sent to the FMS via a database upload. This simplifies the complex process of developing and deploying software updates for the FMS. As described herein, the FMS may also be described as a flight management device (FMD), a flight management control (FMC), or a flight management control system (FMCS).

In illustrative examples of the present disclosure, a system, method, and a computer-readable medium are provided for updating a flight management system. According to one particular implementation, a system comprises a flight management system that is configured to execute at least one operation. The system also includes a storage device, storing thereon a database that is operable to store data usable by the flight management system to execute the operation. The database is configured to receive updates that pertain to the operation executed by the flight management system. Utilizing an updated database, the flight management system is then configured to update the operation without updating the operational software of the flight management system.

According to another implementation, a method for executing at least one operation in a flight management system is disclosed herein. An example of the invention method comprises storing data usable by the flight management system to execute the operation. The method further comprises receiving updates to the database that pertain to the operation executed by the flight management system. The updated database enables updating of the operation without updating the operational software of the flight management system.

According to yet another implementation, a computer-readable medium bearing computer-executable instructions is described. The computer-executable instructions, when executed on a computer, cause the computer to store a database in a storage device that is operable to store data usable by the flight management system to execute the operation. The database is further configured to receive updates to the database that pertain to the operation executed by the flight management system such that the updated database enables updating of the operation without updating the operational software of the flight management system.

BRIEF DESCRIPTION OF DRAWINGS

The foregoing Summary and the following Detailed Description are better understood when read in conjunction with the appended drawings. In order to illustrate the present disclosure, various aspects of the disclosure are shown. However, the disclosure is not limited to the specific aspects discussed. The following figures are included.

DETAILED DESCRIPTION OF ILLUSTRATIVE EXAMPLES

In an aircraft (e.g., modern commercial aircraft), the flight management system (FMS) processes various operations such as: navigation, guidance, flight planning, datalink, and performance. For performance operations, the FMS has various internal algorithms that utilize aerodynamic and propulsion performance data stored in the Performance Database (PDB) to compute predicted flight profile and the associated trip prediction parameters. For example, some predicted flight profile and the associated trip prediction parameters include: calculating an estimated time of arrival (ETA) and/or calculating the quantity of fuel consumption for a particular flight plan.

The PDB is typically composed of a number of tables (e.g., in XML format), which are called by different operations in the FMS. FMS operations (e.g., performance computation methods or baseline functions) occasionally need to be updated due to computational improvements or due to errors discovered after the FMS has been delivered to users (e.g., airlines or airline personnel). Generally, the amount of time it takes to introduce new software to the FMS may involve long periods of research and development. In some instances, not all errors in the initial release of the FMS software are caught and fixed before it reaches the users. And in some other instances, users may not utilize all performance computation methods provided by FMS. Additionally, some users may want to modify or update the functionality of the FMS software in order to make their flight operations more efficient or implement functions that are particular to that user. Users typically have to wait several years before they can receive and install updates to the FMS software, for example to improve FMS performance computation methods.

Described herein are methods and systems to update existing FMS operations (e.g., performance computation methods). In some examples, data that can be used to update or provide new operations are uploaded to the FMS via the PDB. For example, when the FMS operations need to be updated, the scope of the update may be limited to the PDB instead of the FMS operational software. In this way, functionality of the FMS, such as performance computation methods, can be quickly updated (e.g., days compared to years) via the PDB. By updating the performance computation methods via the PDB, the reliance on new software updates to the FMS may be reduced. Moreover, the cost of updating performance computation methods can be greatly reduced. While the present disclosure describes examples in the context of updating performance computations via the PDB, it should be understood that the described techniques may be used to generally update functionality of a software-based system using an upload of data rather than updating the operational software.

In some examples, users may develop their own FMS computation methods or algorithms. For example, a collection of FMS methods (e.g., FMS applications) in the PDB can be managed by the users or managed by a third party entity by using a common platform (e.g., application store for FMS). The collection of FMS computation methods may be configured, in application format, and presented to users via this application store. Users can choose specific or desired FMS computation methods from the application store that meets the needs for their fleet of aircraft. Since the performance computation methods can be "pulled out" of the FMS software and instead be updated via the PDB, the development of the FMS software will be greatly simplified.

Figure 1:
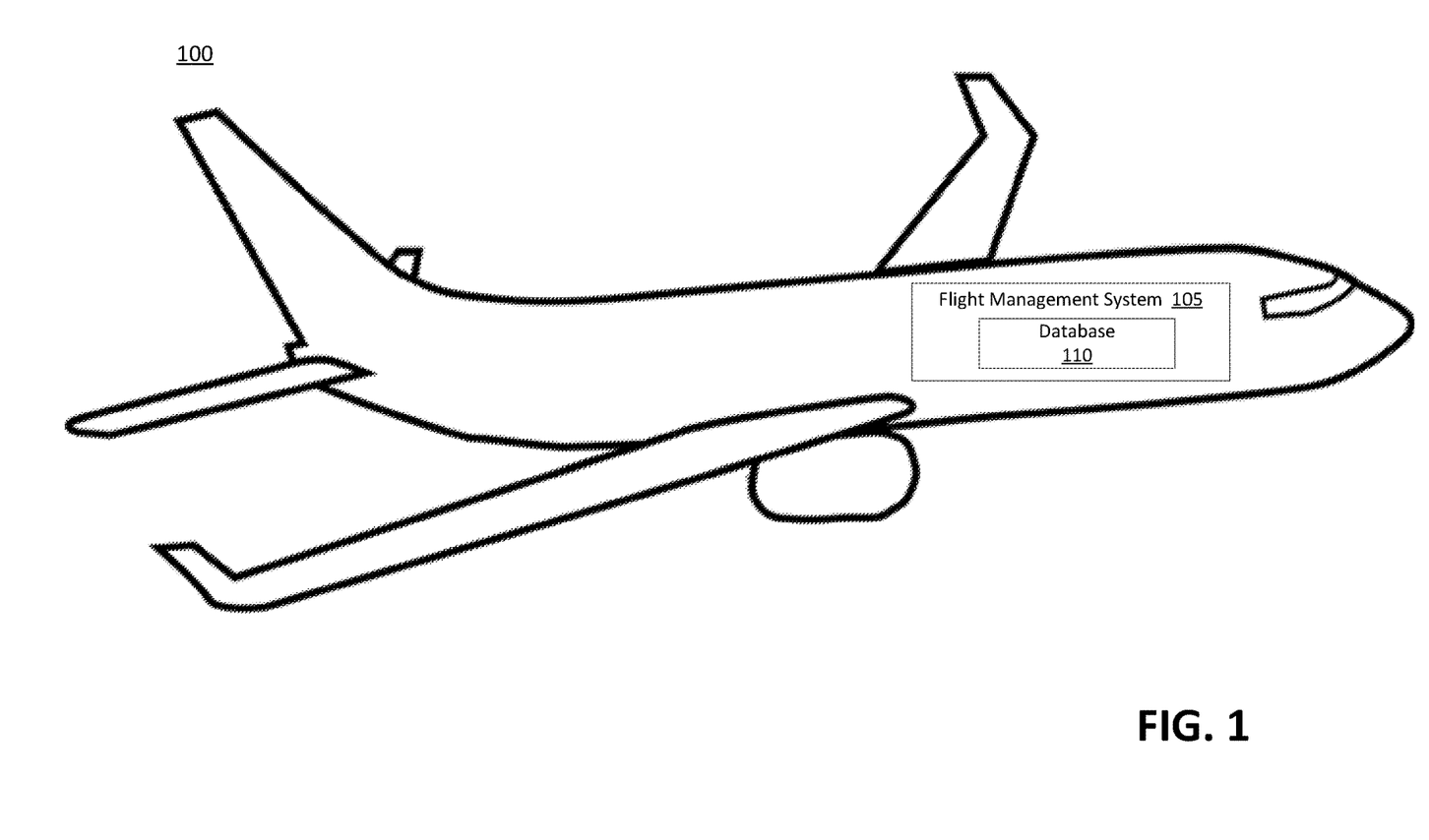
FIG. 1 illustrates an aircraft with a flight management system (FMS) and a performance database (PDB) on board.

FIG. 1 illustrates an aircraft or an aircraft system 100 with a flight management system (FMS) 105 and a database 110. For instance, the database 110 is a performance database (PDB). The PDB 110 may be accessible or loaded into the FMS 105 such that the FMS 105 receives performance data from the PDB 110. Once the FMS 105 receives performance data, the FMS is able to apply operation, performance computation methods, algorithms, or baseline functions to control various on-board systems associated with a flight operation for aircraft 100. The FMS 105 provides flight crew or pilots with the ability to control the aircraft systems and performance functions before, during, and after flight.

Further referring to FIG. 1, the PDB 110 may be configured to store performance data. For example, performance data includes data pertaining to ideal cruising speed of the aircraft and ideal takeoff and landing weight for the aircraft. This performance data may be uploaded or sent to the PDB 110 prior to each flight. In another example, the performance data is sent to the PDB while the aircraft 100 is in-flight via a wireless network. As described in further detail in FIG. 3 below, the PDB 110 may also include updates pertaining to the operations located in the FMS. A user (e.g., pilot, flight crew, or airline personnel) may determine a specific PDB 110 for each individual aircraft. In other words, users have the ability to interchange and provide certain aircraft with specific or different types of the PDB 110 to interact with an aircraft's FMS 105.

Figure 2:
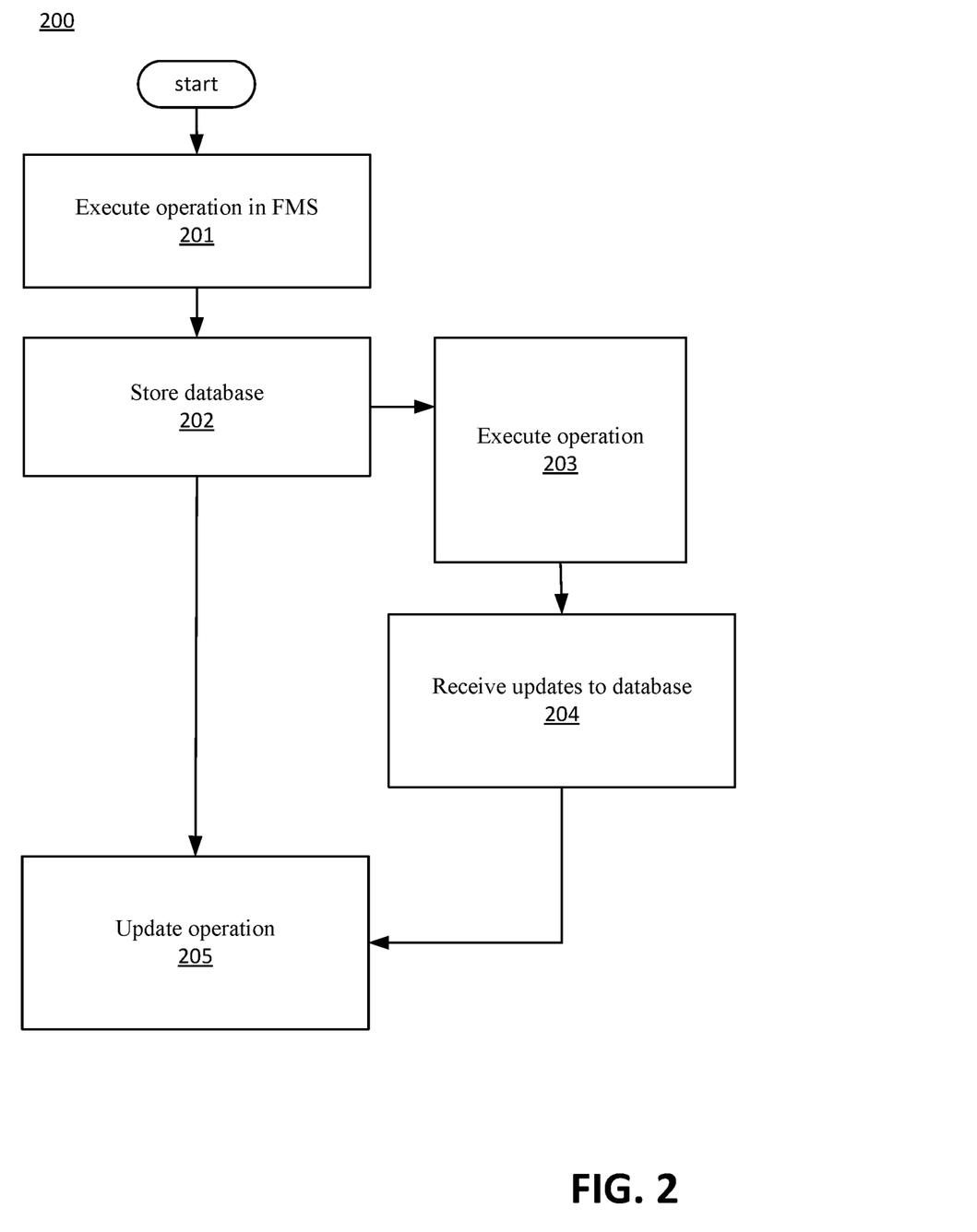
FIG. 2 depicts a flow diagram representing updating operations in a flight management system with a database.

FIG. 2 shows a flowchart 200 illustrating an example of a procedure for updating a FMS in an aircraft. Referring to block 201, the system is configured with a FMS to execute at least one operation. This FMS is typically installed in the flight deck of an aircraft and performs various operations. Some operation examples include: navigation, guidance, flight planning, datalink, and performance functions.

Referring to block 202, the FMS includes at least one database stored thereon. This database may be a performance database (PDB) that is configured to store data such as aerodynamic and propulsion performance data of an aircraft. When the FMS executes an operation with respect to performance, the FMS has various internal algorithms that utilize the aerodynamic and propulsion performance data stored in the PDB to compute predicted flight profile and the associated trip prediction parameters such as Estimated Time of Arrival (ETA) and predicted fuel consumption quantity. The PDB is generally uploaded into the FMS prior to takeoff by a user or a separate computing device. In some alternate examples, the PDB receives updates after takeoff (e.g., while in-flight) via a wireless communication network.

In block 203 and as described in block 202, the PDB is configured to store data. Typically the stored data in the PDB is related to the performance of the aircraft. The stored data is used by the FMS to execute, compute, or calculate performance related operations.

Referring to block 204, the database receives updates to the PDB that pertain to at least one operation executed by the FMS. That is, the PDB is configured to not only store performance related data but also configured to receive updates to the operations in the FMS. In some instances, the updates are sent to the PDB if a user requests new or updated performance computations for a specific aircraft. Alternatively, the user may determine that the operations in the FMS contain an error or may be improved or otherwise modified, and the operation needs to be replaced. In some examples, the determination to replace the operation is not limited to the user. Rather, the updates to the flight operations may be sent to the FMS automatically by the software provider or by another entity.

Updates to the operations can be presented to a user via the FMS from the PDB. These new instructions may be presented in application format via a Control Display Unit (CDU) of the FMS. That is, each of the instructions may be presented in an application store or a CDU page for the pilots to select from. In some instances, the default baseline functions that already exist in the FMS and the new or updated operations may be presented to the user simultaneously via the CDU of the FMS.

In block 205, the system is configured update at least one operation without updating an operational software of the FMS. The updated PDB provides the necessary or additional operations that include information indicative of fixes or updates to the original operations running in the FMS. With the updated operation and also the performance data received from the PDB, the FMS is configured to compute operations to control manage various flight-related operations. For example, the updated operation utilizes the performance related data, received from the PDB, to compute at least one of: predicted flight profile, estimated time of aircraft arrival, and aircraft fuel consumption quantity. The results of these computations may then adjust flight operations for an aircraft.

Figure 3:
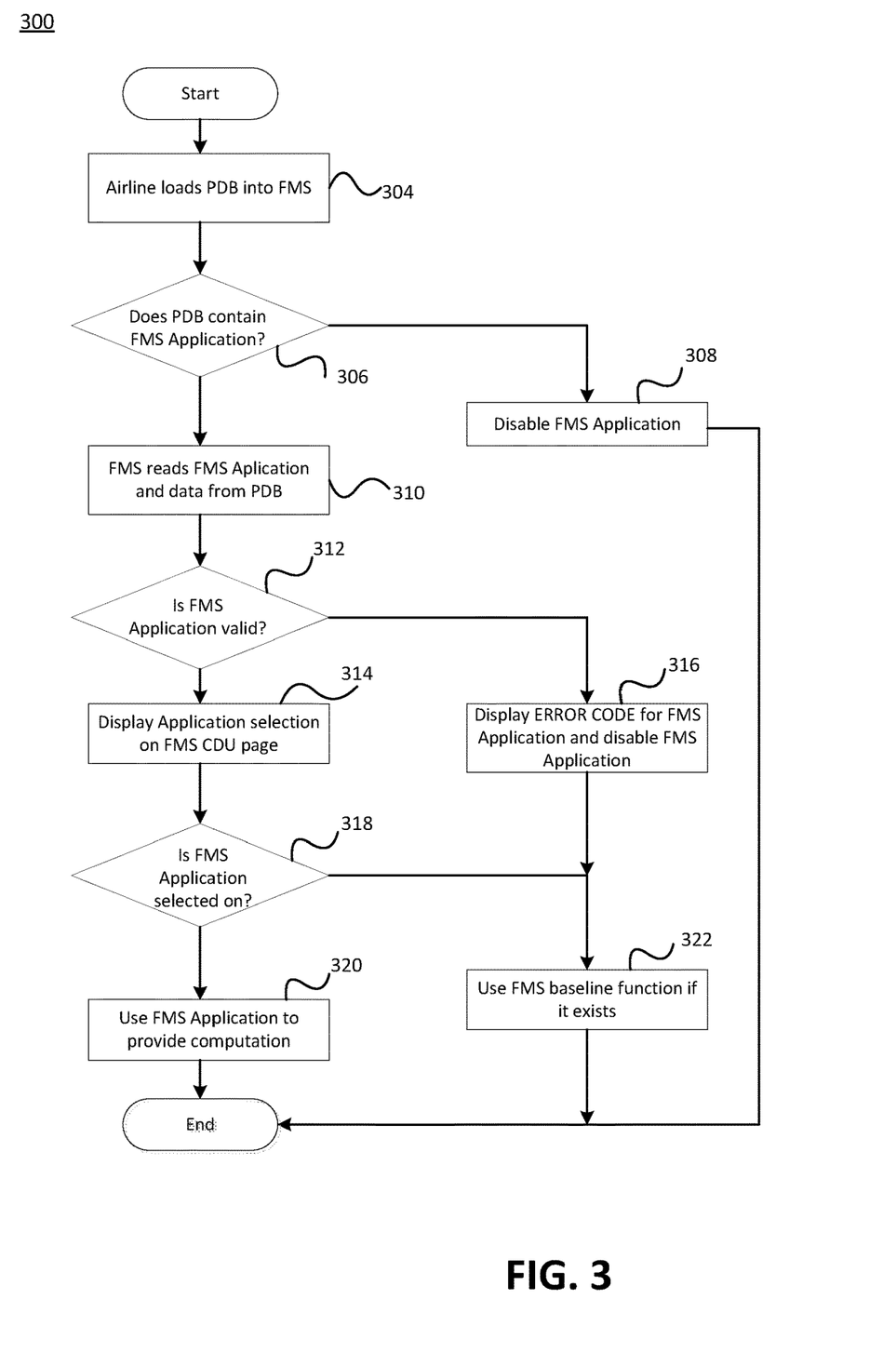
FIG. 3 is a flow diagram representing loading specific updated operations from the PDB to the FMS.

FIG. 3 illustrates a flow diagram 300 representing an user (e.g., airline) that loads a PDB to a FMS. The PDB is loaded into the FMS preferably prior to takeoff of an aircraft. The FMS, when initially created, is configured to execute at least one operation associated with flight performance of an aircraft. The at least one operation, when processed by the FMS along with the data received from the PDB, may direct, instruct, or compute predicted flight profiles and trip prediction parameters.

As described above, the PDB contains performance data and receives updates to the operations. The updates are either a new version or an updated version of the current operations executing in the FMS. In some instances, the FMS is configured to receive the updated operations from the performance database if an error has occurred or if computational improvements to the operations are deemed necessary. In other instances, users or airline personnel determine that improvements to the operations are necessary, so the updates are sent to the PDB for the FMS to load and execute. By receiving, via the PDB, the updated operations, the FMS does not need to wait for new software to update its functionality.

Furthering referring to FIG. 3, the airline or user elects to load a specific PDB into the FMS 304 on aboard an aircraft. As discussed above, PDB's include storage of various performance data. The performance data from a PDB provides an FMS with the information necessary to compute performance functions for each flight. However, in some instances, the PDB may include updated operations and an application to run these instructions. If the PDB contains an application for the FMS to run 306, the FMS then reads the application and the performance data stored in the PDB 310. Conversely, if the PDB does not contain an FMS application, then the FMS application is disabled 308.

Once the FMS application has been determined to be valid, the applications (e.g., the list of updates to the operations) are displayed by the FMS to the user. Generally, the user is the pilot or authorized flight crew personnel. In other words, a list of updates, in application format, can be presented to a user via the CDU page in the FMS 314. If the FMS application is not valid, then an error or an error code is presented to the user of the FMS and the FMS application is then disabled 316.

The FMS application may be configured to be activated. That is, a user of the FMS may control whether to use the FMS application or not. If the FMS application is selected "on" 318 then the user is able to use the FMS application to select certain updates to provide computation 320. In contrast, if the FMS application is not on or is in the "off" mode then the FMS baseline functions may be used 322. That is, the original operations loaded in the FMS are not updated or replaced, so the baseline functions are used for flight performance computations.

Figure 4:
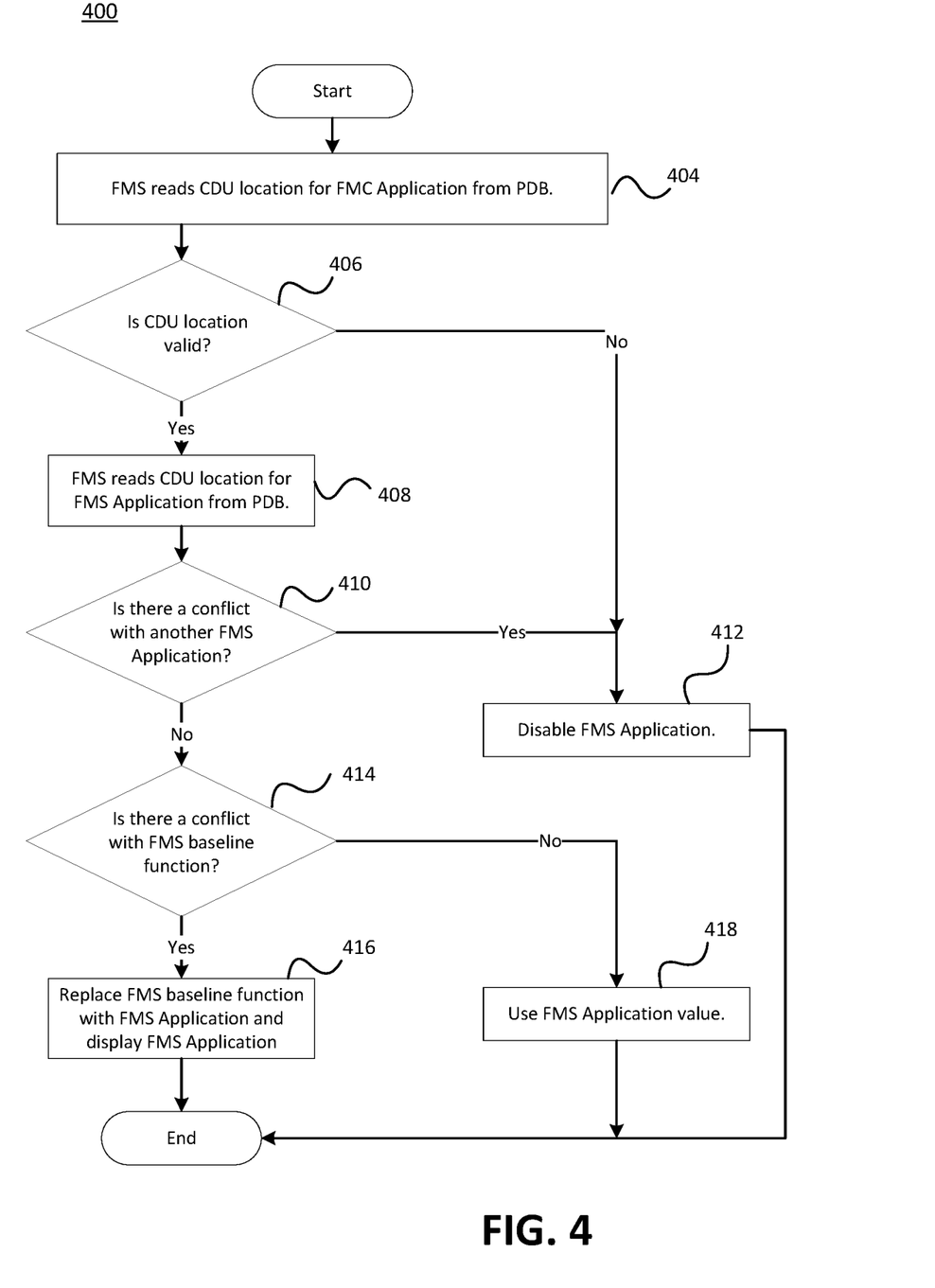
FIG. 4 illustrates a flow diagram of replacing operations (e.g., baseline functions) in the FMS with new functions.

FIG. 4 depicts a flow diagram 400 illustrating the process of updating the operations (e.g., baseline functions) in the FMS by using an application to select new or updated operations 402. Initially, the FMS reads a CDU location for the FMS application from the PDB 404. Once that location is deemed valid 406, the FMS reads the CDU location for the FMS application from the PDB 408 and eventually presents it to a user. If the CDU location is not valid, then the FMS application is disabled 412.

The FMS also further determines or checks whether the FMS application received from the PDB has a conflict with another FMS application 410. If not, then the FMS checks if there is a conflict with the FMS baseline function 414. If not, then the FMS uses the FMS application value 418. Otherwise, the FMS baseline function is replaced with updated operations as presented in the FMS application 416.

Figure 5:
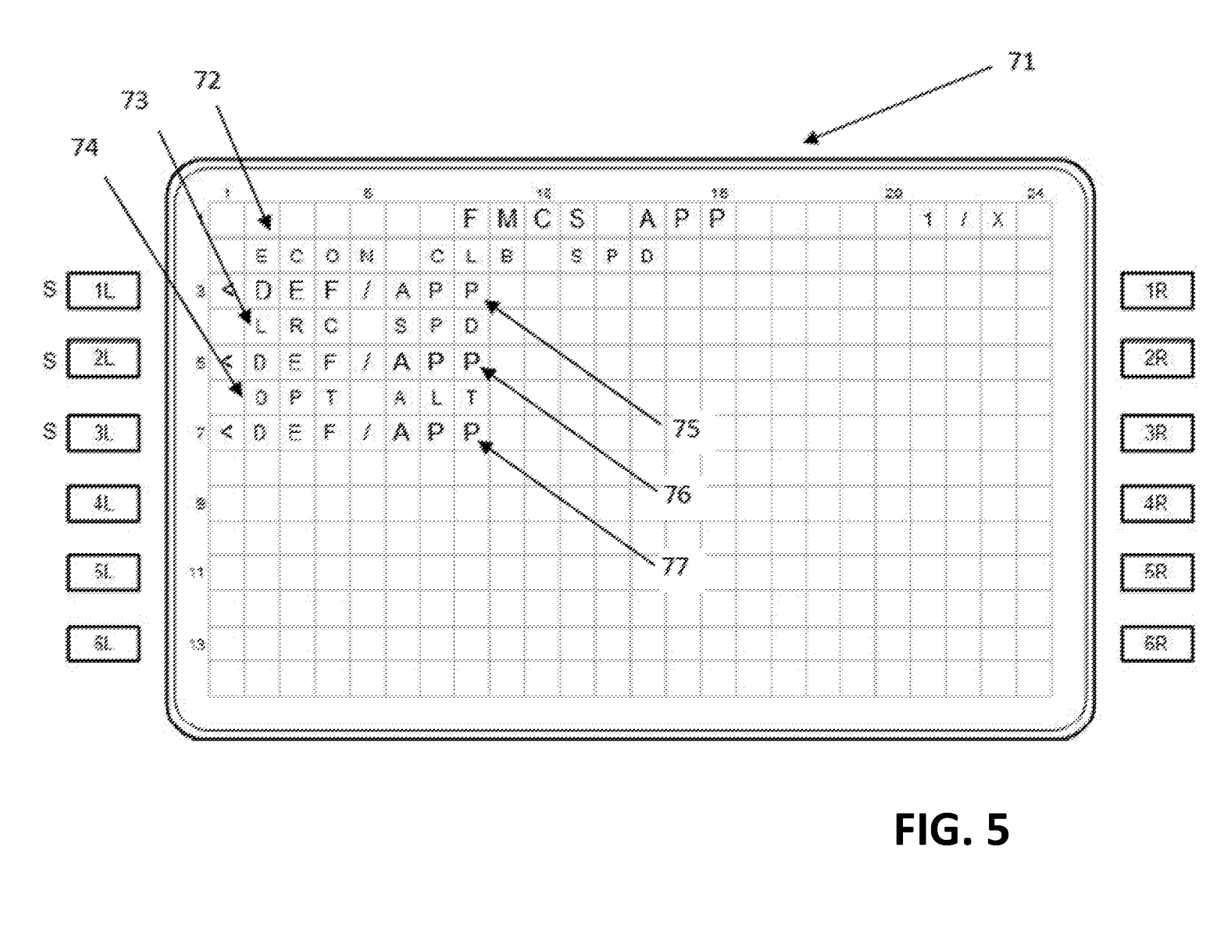
FIG. 5 illustrates an FMS Control Display Unit (CDU) page where a list of FMS applications is presented.
Figure 6:
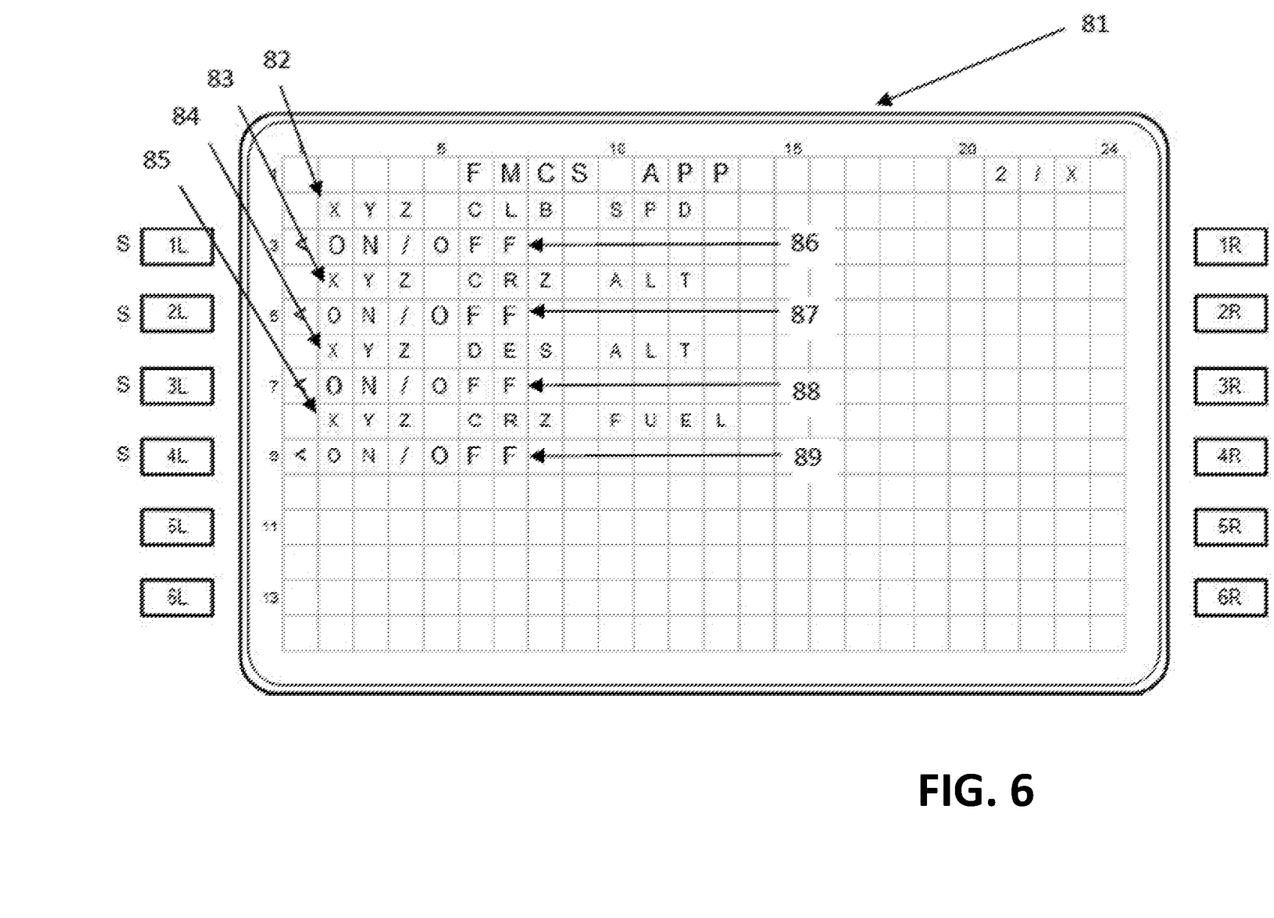
FIG. 6 illustrates an alternate example of a FMS CDU page showing a list of FMS applications.
Figure 7:
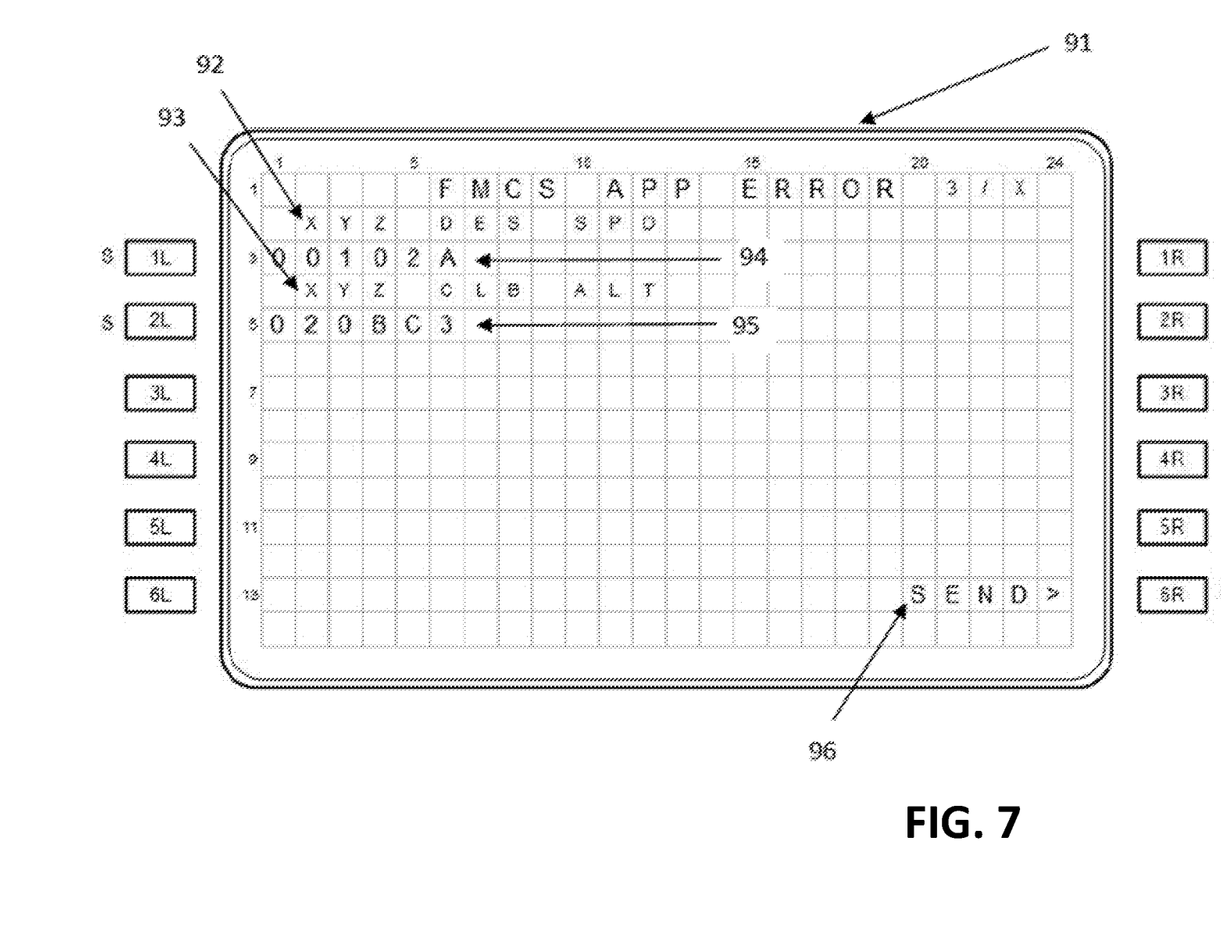
FIG. 7 depicts an alternate example of a FMS CDU page showing a list of FMS applications that is deemed unusable by the FMS software.

FIG. 5 shows a FMS application displayed on a CDU page 71. Flight management control system (FMCS), as illustrated in FIGS. 5-7 and as discussed above, is an alternate description of the FMS. Thus, the description of FIGS. 5-7, as presented below, will refer to FMCS as simply FMS.

The page 71 in FIG. 5 depicts a list of possible FMS applications 72, 73, 74 that are stored in the PDB and recognized by the FMS software. The list of possible FMS applications 72, 73, 74 are presented to a user (e.g., pilot) in an application-like architecture. That is, page 71 is presented in a manner similar to that of an application store with a list of applications that allows a user to select from. In FIG. 5, page 71 illustrates FMS applications 72, 73, 74 whose baseline functions already exist in the FMS software. This allows the user to determine which of the baseline functions with respect to performance related computation methods will be used.

Further referring to FIG. 5, the user can decide to activate the FMS application. Furthermore, the user can decide whether to use baseline functions 75, 76, 77. This creates flexibility and options for the user to determine whether updates from the PDB should be used. Simply put, the updated performance computation methods from the PDB are presented to a user via page 71. A user is then free to choose and determine which computational functions to use for a given flight.

FIG. 6 shows an example of a FMS CDU page 81 showing a list of FMS applications. In particular, page 81 depicts a list of FMS applications 82, 83, 84, 85 for a particular airline (e.g., XYZ Airline). These FMS application 82, 83, 84, and 85 are contained in the accessible or connected PDB but are not in the FMS software. In other words, these FMS applications 82, 83, 84, 85 can be custom functions that users such as an airline can design to serve their operational needs. These new functions may also be generated by a separate third party or separate computing device and loaded in the PDB previously or while in-flight.

The FMS applications 82, 83, 84, 85 displayed on this page 81 do not include baseline functions as depicted in FIG. 5. In FIG. 6, however, the user can select to turn on the FMS application 86, 88 or to turn off the FMS application 87, 89. In other words, the user has the option as to whether to use the updates received from the PDB.

This feature can be useful when a third party or authorized personnel wants to introduce new or altered computational methods or other updated functions to an FMS. Instead of making numerous functions as baseline in the FMS software to accommodate multiple such requests, the third party or authorized personnel can decide to offload them into the PDB to reduce cost and time to build/test/certify the new FMS software (or any other system).

FIG. 7 depicts an example of a FMS CDU page 91 illustrating a list of FMS applications that is deemed unusable by the FMS software. Page 91 illustrates, similar to the list depicted in FIG. 6, a list of FMS applications 92, 93 from the PDB for a specific airline (e.g., XYZ Airlines). However, these FMS applications 92, 93 presented to the user in page 91 are deemed unusable by the FMS software. For each unusable FMS application 92, 93, an error code is displayed 94, 95. The error code can be used to indicate why the FMS application is disabled (such as incompatible FMS software, FMS variables, memory size, etc.). In some instances, the user can choose to print out the report or send the report out to the ground system via datalink 96.

Figure 8:
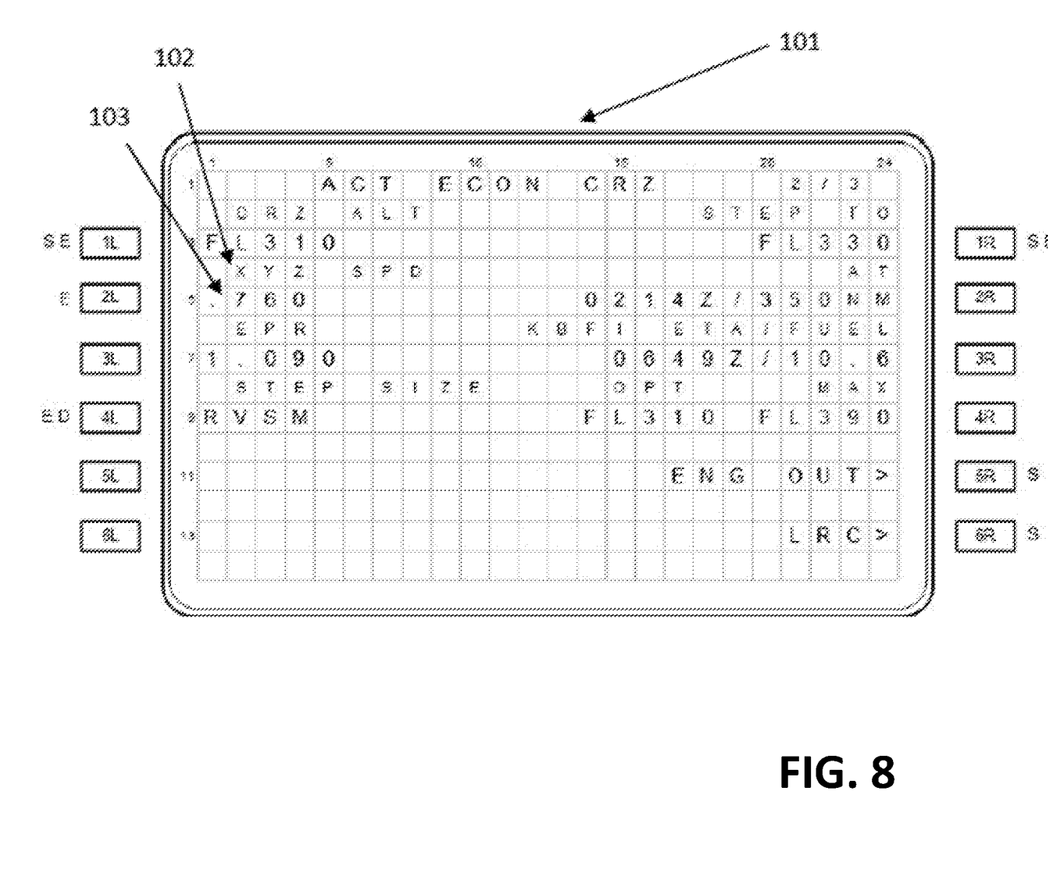
FIG. 8 illustrates an alternate example of a FMS CDU page showing values computed by FMS applications.

FIG. 8 illustrates an example of a FMS CDU page 101 showing values computed by FMS applications. When a FMS application is enabled and is actively providing a value 103, its associated field displays the header 102 defined in PDB to indicate to the user that a FMS application is in use. However, when a FMS application is turned off and the baseline function is used, the header returns to the default value. In other words, this provides a user who is interacting with the FMS via the CDU an indication as to whether an FMS application is in use or not.

Figure 9:
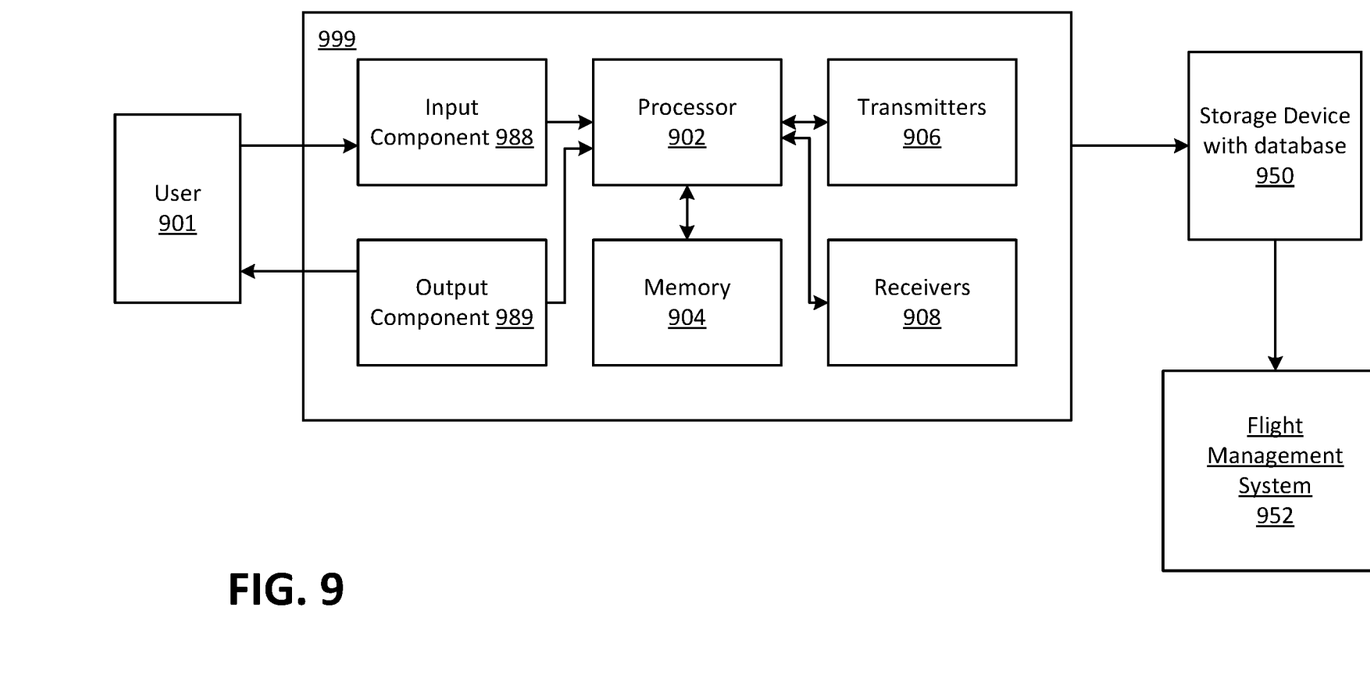
FIG. 9 depicts an example schematic diagram of a system with a computing device connected to storage device for end-to-end communication.

FIG. 9 is an example schematic diagram 900 of a computing device that may be used in conjunction with a storage device with a database 950 stored thereon, and which may be suitable for implementing one or more of the techniques described herein. The database 950 may be loaded into a flight management system 952. Moreover, a user 901 may direct which type or when a database is loaded into the flight management system 952.

In one example, a computing device 999 may include a processor 902, a memory device 904 coupled to processor 902, one or more wireless transmitters 906, one or more wireless receivers 908, an output component 989, and an input component 988.

Processor 902 includes any suitable programmable circuit including one or more systems and microcontrollers, microprocessors, reduced instruction set circuits (RISC), application specific integrated circuits (ASIC), programmable logic circuits (PLC), field programmable gate arrays (FPGA), and any other circuit capable of executing the functions described herein. The above example examples are not intended to limit in any way the definition and/or meaning of the term "processor."

Memory device 904 includes a non-transitory computer-readable storage medium, such as, without limitation, random access memory (RAM), flash memory, a hard disk drive, a solid state drive, a diskette, a Flash drive, a compact disc, a digital video disc, and/or any suitable memory. In the example implementation, memory device 904 includes data and/or instructions embodying aspects of the disclosure that are executable by processor 902 (e.g., processor 902 may be programmed by the instructions) to enable processor 902 to perform the functions described herein. Additionally, the memory device 904 may comprise an operation system and applications.

Wireless transmitters 906 are configured to transmit control signals and data signals over a network. In one example, wireless transmitters 906 may transmit in a radio frequency spectrum and operate using an appropriate communication protocol.

Wireless receivers 908 are configured to receive control signals and data signals over network. In one example, wireless receivers 908 may receive signals on a radio frequency spectrum using an appropriate communication program.

The computing device 999 may also include at least one output component 989 for presenting information to a user 901. Output component 989 may be any component capable of conveying information to user 901. In some implementations, output component 989 includes an output adapter, such as a video adapter and/or an audio adapter or the like. An output adapter is operatively coupled to processor 902 and is configured to be operatively coupled to an output device, such as a display device (e.g., a liquid crystal display (LCD), organic light emitting diode (OLED) display, cathode ray tube (CRT), "electronic ink" display, or the like) or an audio output device (e.g., a speaker, headphones, or the like). In some implementations, at least one such display device and/or audio device is included with output component 989.

The computing device 999 may also include at least one input component 988 for receiving input from user 901. Input component 988 may include, for example, a keyboard, a pointing device, a mouse, a stylus, a touch sensitive panel (e.g., a touch pad or a touch screen), a gyroscope, an accelerometer, a position detector, an audio input device, or the like. A single component, such as a touch screen, may function as both an output device of output component 989 and input component 988. In some implementations, output component 989 and/or input component 88 include an adapter for communicating data and/or instructions between the node and a computer connected thereto.

In some examples, a system memory may be used, which is one example of a computer-readable storage medium, configured to store program instructions and data as described above for FIGS. 1-8 for implementing examples of the corresponding methods and apparatus. However, in other examples, program instructions and/or data may be received, sent, or stored upon different types of computer-accessible media. Generally speaking, a computer-readable storage medium may include non-transitory and tangible storage media or memory media such as magnetic or optical media, e.g., disk or DVD/CD coupled to a computer system or gateway device. A computer-readable storage medium may also include any volatile or non-volatile media such as RAM (e.g., SDRAM, DDR SDRAM, RDRAM, SRAM, etc.), ROM, etc., that may be included in some examples of the computer systems described above as system memory, gateway device, or another type of memory. Portions or all of the multiple computer systems, such as those illustrated herein, may be used to implement the described functionality in various examples; for example, software components running on a variety of different devices and servers may collaborate to provide the functionality.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. As used in the description of the disclosure and the appended claims, the singular forms "a", "an" and "the" are intended to include the plural forms as well, unless the context clearly indicates otherwise. It will be further understood that the terms "comprises" or "comprising," when used in this specification, specify the presence of stated features, integers, steps, operations, elements, and/or components, but do not preclude the presence or addition of one or more other features, integers, steps, operations, elements, components, and/or groups thereof. Furthermore, the terms "assets" and "computing devices," when used in this specification, may be used interchangeably.

It will be understood by those skilled in the art that various changes may be made and equivalents may be substituted for elements thereof without departing from the scope of the teachings herein. In addition, many modifications may be made to adapt the teachings herein to a particular situation without departing from the scope thereof. Therefore, it is intended that the claims not be limited to the particular implementations disclosed herein.

What is claimed:

1. A method for updating functionality of a flight management system having operational software executing on a computing system, the method comprising:
  storing a performance database comprising performance data and a performance computational method;
  executing at least one operation of the flight management system operational software at least in part by calling the performance database having the performance data and the performance computational method; and
  updating the at least one operation by receiving an update to the performance database having an update to the performance computational method used to execute the at least one operation; and
  executing the at least one updated operation at least in part by calling the updated performance database having the update to the method used to execute the at least one updated operation.

2. The method according to claim 1, wherein the at least one operation is one of: a navigation operation, a guidance operation, a flight planning operation, a datalink operation, and a performance operation.

3. The method according to claim 2, wherein when the flight management system executes the performance operation, the flight management system computes at least one of: predicted flight profile, estimated time of aircraft arrival, and aircraft fuel consumption quantity.

4. The method according to claim 1, wherein the flight management system, via a control display unit, allows a user to select the updated performance computational method for the flight management system to execute.

5. The method according to claim 1, wherein the update to the performance database correct an error in the flight management system.

6. The method according to claim 1, wherein updates to the performance database are caused by loading new or updated operations to the performance database via a separate computing device.

7. The method of claim 1, wherein the flight management system is configured to execute a plurality of operations, and the method further comprises:
  presenting the update to the plurality of operations via a control display unit for selection by a user for a given flight; and
  accepting user-selected updates to the plurality of operations; and
  applying only the user-selected updates to the plurality of operations with the flight management system.

8. The method of claim 7, wherein the flight management system is further configured to further present an indication of which of the plurality of operations are in use.

9. The method of claim 1, wherein the performance data includes aerodynamic data.

10. The method of claim 1, wherein the performance database further comprises:
  a flight management system application, for selectably enabling the received update to the performance computation method.

11. A computer-readable storage medium having computer-executable instructions that, when executed upon a computer, cause the computer to perform operations comprising:
  executing at least one operation of operational software of a flight management system at least in part by calling a performance database having performance data and a performance computational method;
  updating the at least one operation by receiving an update to the performance database including an update to the performance computational method used to execute the at least one operation executed by the flight management system; and
  executing the at least one updated operation at least in part by calling the updated performance database having the update to the method used to execute the at least one updated operation.

12. The computer-readable storage medium according to claim 11, wherein the at least one operation is one of: a navigation operation, a guidance operation, a flight planning operation, a datalink operation, and a performance operation.

13. The computer-readable storage medium according to claim 12, wherein when the flight management system executes the performance operation, the flight management system computes at least one of: predicted flight profile, estimated time of aircraft arrival, and aircraft fuel consumption quantity.

14. The computer-readable storage medium according to claim 11, further having computer-executable instructions that, when executed by the computer, cause the computer to perform operations comprising:
  allowing a user to select the updated performance computational method for the flight management system to execute.

15. The computer-readable storage medium according to claim 11, wherein updates to the performance database occur when an error in the flight management system is identified.

16. A system for updating functionality of a flight management system having operational software executing on a computing system, the system comprising:
  a processor;
  a memory, communicatively coupled to the processor, the memory storing instructions comprising instructions for:
    storing a performance database comprising performance data and a performance computational method;
    executing at least one operation of the flight management system operational software at least in part by calling the performance database having the performance data and the performance computational method; and
    updating the at least one operation by receiving an update to the performance database having an update to the performance computational method used to execute the at least one operation; and
    executing the at least one updated operation at least in part by calling the updated performance database having the update to the method used to execute the at least one updated operation.

17. The system according to claim 16, wherein the at least one operation is one of: a navigation operation, a guidance operation, a flight planning operation, a datalink operation, and a performance operation.

18. The system according to claim 17, wherein when the flight management system executes the performance operation, the flight management system computes at least one of: predicted flight profile, estimated time of aircraft arrival, and aircraft fuel consumption quantity.

19. The system according to claim 16, wherein the flight management system, via a control display unit, allows a user to select the updated performance computational method for the flight management system to execute.

20. The system according to claim 16, wherein the updates to the performance database correct an error in the flight management system.

21. The system according to claim 16, wherein updates to the performance database are caused by loading new or updated operations to the performance database via a separate computing device.

\* \* \* \* \*